Oct. 4, 1938.   C. B. HALL   2,132,069
HAND TRUCK
Filed Oct. 2, 1937   2 Sheets-Sheet 1
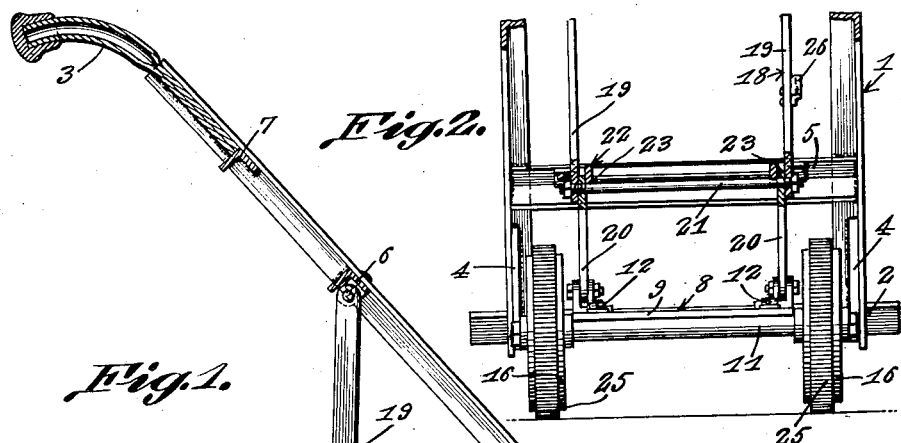
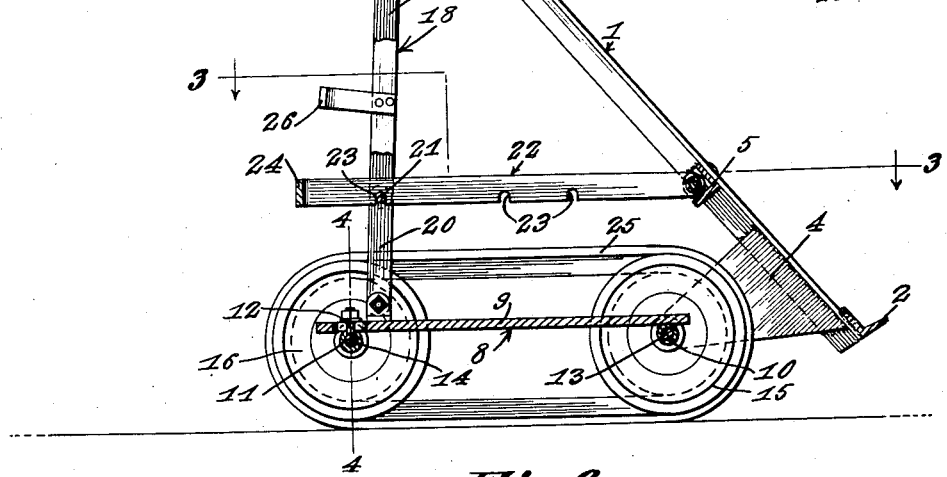
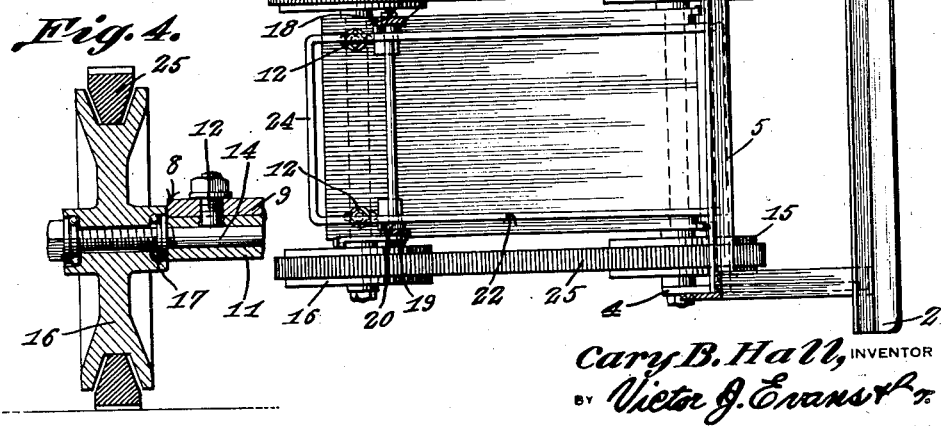
Cary B. Hall, INVENTOR
BY Victor J. Evans
ATTORNEYS Oct. 4, 1938.          C. B. HALL                2,132,069
                       HAND TRUCK
            Filed Oct. 2, 1937         2 Sheets-Sheet 2
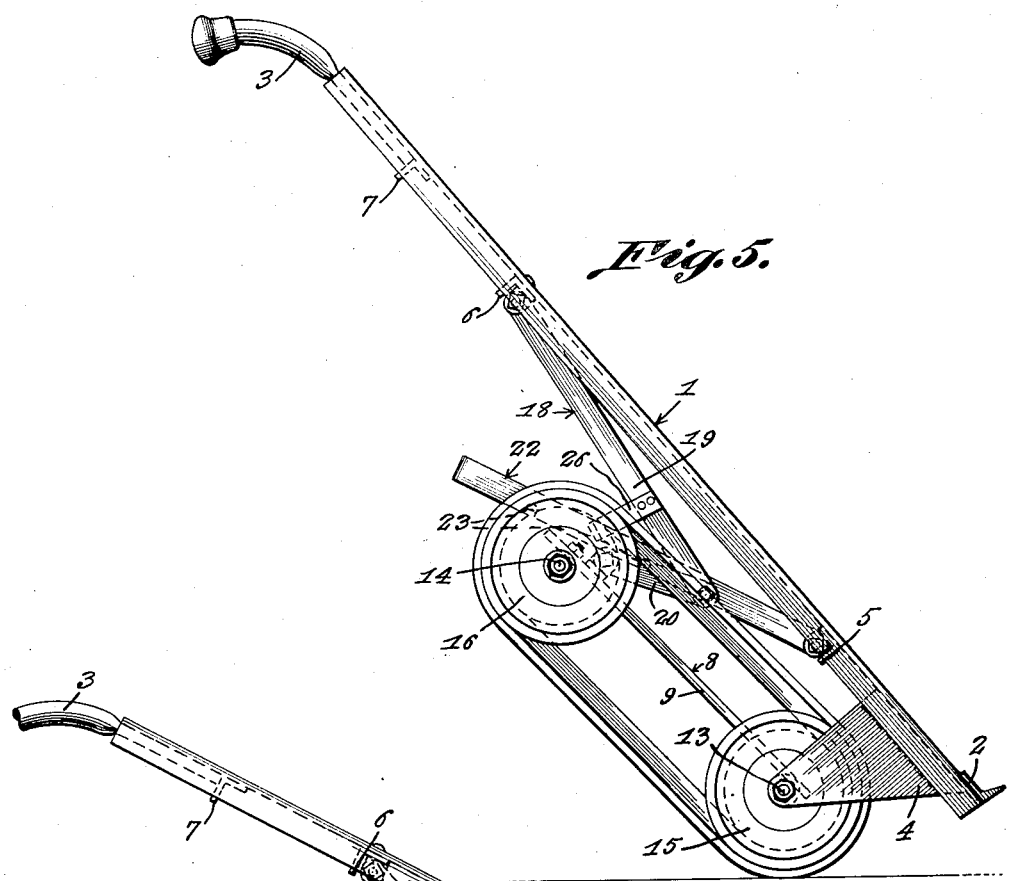
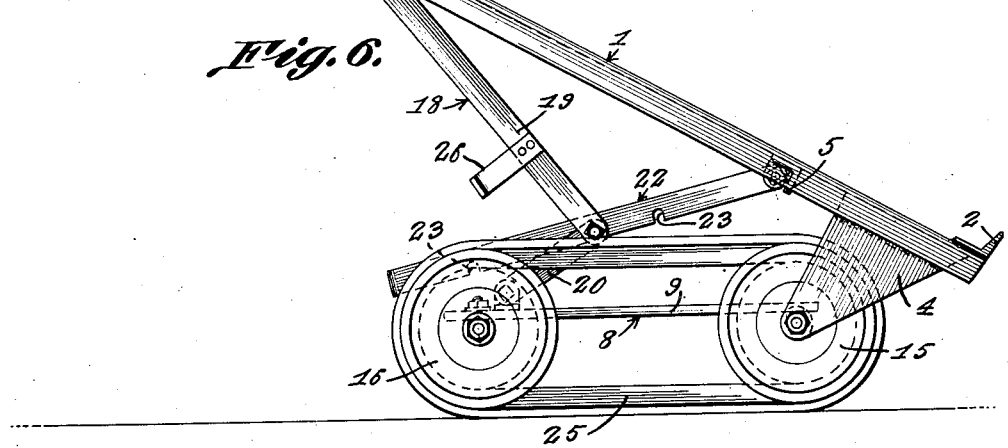

Patented Oct. 4, 1938

2,132,069

UNITED STATES PATENT OFFICE 2,132,069

HAND TRUCK

Cary B. Hall, Nashville, Tenn.

Application October 2, 1937, Serial No. 167,061

2 Claims. (Cl. 280—54)

This invention relates to hand trucks especially adapted for the handling and conveying of heavy and bulky articles either crated or uncrated such as furniture, refrigerators, stoves and the like and has for the primary object the provision of a device of this character which may be conveniently handled and used similarly to a conventional type of two wheel truck and which may be readily positioned or adjusted for use as a four wheel type truck whereby the load may be entirely sustained on the wheels, freeing the operator of the load which permits the operator to move maximum loads from one place to another without being strained or burdened by the load.

Another object of this invention is the provision of endless or caterpillar type treads which will permit the use of the truck on the two or four wheel principle and will permit the truck to be easily and quickly moved from one elevation to another while carrying a maximum load.

A further object of the invention is the provision of an under carriage including the wheels and the caterpillar treads and an adjustable connection between said under carriage and the truck frame whereby the latter may be adjusted relative to said under carriage for load balancing and for positioning the truck frame and under carriage in such a relation to each other as to permit a maximum load to be carried up and down stairs by the truck, the treads traveling over the flights of the stairs without unduly disturbing the load on the truck.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating a hand truck constructed in accordance with my invention.

Figure 2 is a fragmentary end elevation, partly in section, illustrating the same.

Figure 3 is a horizontal sectional view taken on the line 3—3 of Figure 1.

Figure 4 is a detail transverse sectional view taken on the line 4—4 of Figure 1.

Figure 5 is a side elevation illustrating the truck adjusted to be used on the two wheel principle or for moving loads up and down stairs.

Figure 6 is a side elevation illustrating the truck adjusted for use on the four wheel principle wherein the load may be balanced on the under carriage and whereby the truck may be used for moving loads from one elevation to another.

Referring in detail to the drawings, the numeral 1 indicates a hand truck frame having a shoe 2 at one end and hand grips 3 at the opposite end. The shoe 2 is employed for placing the truck frame under a load for tilting the load onto the frame and for sustaining the load on the frame when moving the load from one place to another. The side members of the frame 1 adjacent the shoe have secured thereon axle plates 4. To strengthen the side members of the truck frame cross members 5 and 6 are connected thereto. An additional cross member 7 may be employed for connecting the side members and is located between the cross member 6 and the hand grips 3. The members of the truck frame described except the shoe 2 and axle plates 4 may be constructed of angle iron to give strength and durability.

An under carriage 8 is provided for the truck frame and includes a member 9 which may be in plate formation or of a frame construction and has secured thereto adjacent opposite ends axle sleeves 10 and 11. The sleeve 10 is fixed on the member 9 while the sleeve 11 is adjustably connected thereto, as shown at 12. Front and rear axles 13 and 14 are journaled in the sleeves 10 and 11. The front axle 13 is journaled in the axle plates 4 and has journaled thereon front wheels 15, the rear axle has journaled thereon rear wheels 16 which track the front wheels when in use. Anti-friction bearings 17 may be provided between the wheels and their respective axles. The truck frame due to the axle plates 4 being journaled on the front axle may pivot on the under carriage 8.

A foldable connection 18 is provided between the truck frame and the under carriage consisting of pairs of connecting links 19 and 20, the links 19 and 20 being pivotally connected by a rod 21. The links 19 are pivotally connected on the cross member 6 of the truck frame and the links 20 are pivotally connected on the member 9 of the under carriage adjacent the rear axle. It is preferable that the links 20 be shorter than the links 19 to position the rod 21 comparatively close to the under carriage but in a plane above the same. A latching construction 22 is pivoted on the truck frame and is of substantially U-shaped frame construction, the ends of which are pivoted on the cross member 5 of the truck frame and the side portions have relatively spaced opposed notches 23. The connecting portion is indicated by the character 24 and positioned beyond the links to act as a hand grip whereby the latching construction may be pivoted for engaging the various notches with the rod 21. This permits the position of the rod to be varied and thereby bring about adjustment of the foldable connection 18 to vary the relative relation of the truck and under carriage.

The front and rear wheels at opposite sides of the under carriage have adapted thereto endless or caterpillar type tread members 25. The wheels may have their peripheries grooved to receive the tread elements 25. Tread elements 25 of the character described permit this device to be conveniently passed or caused to travel over irregular surfaces.

The hand truck adjusted in the position as shown in Figure 1 will sustain the load on its under carriage of the four wheel principle relieving the operator of any burden of the load and should it be desired to further balance the load on the under carriage the truck frame may be adjusted into the position as shown in Figure 6 with respect to the under carriage. The truck when in this position as shown in Figure 6 can be made to convey a load from one elevation to another simply by pivoting the load either on the front or rear wheels. For instance, when desiring to carry a load by the truck from the street level to a sidewalk level, the load may be caused to pivot on the rear wheels by a downward pressure on the hand grips elevating the front wheels over and onto the curb so that on forward movement of the truck the endless treads smoothly transfer the truck from the street level to the sidewalk level. During the use of the truck for the purposes mentioned it is apparent that it can be conveniently handled and moved by a single operator with a maximum load on the truck.

To use the truck on the two wheel principle, the under carriage and truck frame are adjusted relative to each other, as shown in Figure 5, the load then being sustained by the front wheels and balanced thereon by the operator having hold of the hand grips. The truck when in this latter-named adjusted position can be conveniently used for carrying a load up and down stairs, the endless treads efficiently sustaining the load from one flight to another of the stairs. Large articles heretofore requiring four or more men to carry up and downstairs can be conveniently moved up and down stairs with the truck, as shown in Figure 5, by not more than two persons, one at each end of the truck frame.

Secured on the links 19 are foot rests 26 to be employed by a foot of the operator when it is desired to fold the links 19 and 20 relative to each other. Of course, the folding of the links 10 can be easily brought about whenever the latching construction 22 is disengaged from the rod 21.

What is claimed is:

1. A hand truck comprising an under carriage including front and rear axles and a connecting structure therebetween, front and rear wheels journaled on said axles, a truck frame journaled on the front axle, endless tread elements connecting the front and rear wheels, an adjustable connection between the under carriage and the frame and including pairs of links, a rod pivotally connecting the pairs of links and one pair of links being pivoted on the under carriage adjacent the rear axle and the other pair of links being pivoted on the truck frame, and a latching means connected to the truck frame and engageable with the rod while the angle of inclination between the pairs of links may be varied to adjust the relative relation of the truck frame and the carriage.

2. A hand truck comprising an under carriage including front and rear axles and a connecting structure therebetween, front and rear wheels journaled on said axles, a truck frame journaled on the front axle, endless tread elements connecting the front and rear wheels, an adjustable connection between the under carriage and the frame and including pairs of links, a rod pivotally connecting the pairs of links and one pair of links being pivoted on the under carriage adjacent the rear axle and the other pair of links being pivoted on the truck frame, a member pivoted on the frame and having a plurality of notches engageable with said rod whereby the angle of inclination between the pairs of links may be varied to adjust the relative relation of the truck frame and the under carriage.

CARY B. HALL.